July 12, 1949.  H. A. TREBLER  2,476,163
CONTINUOUS AUTOMATIC SAMPLING OF LIQUIDS
IN PROPORTION TO THE FLOW
Filed May 15, 1944
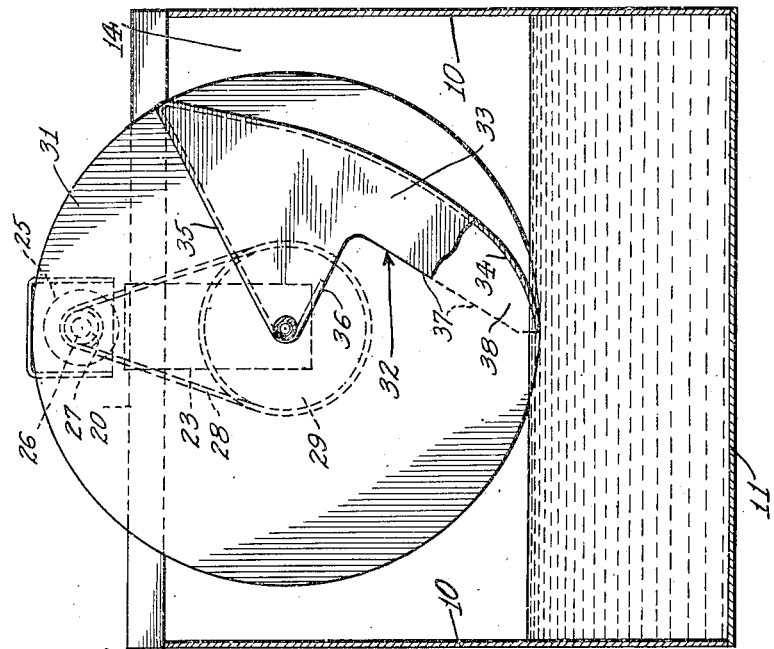
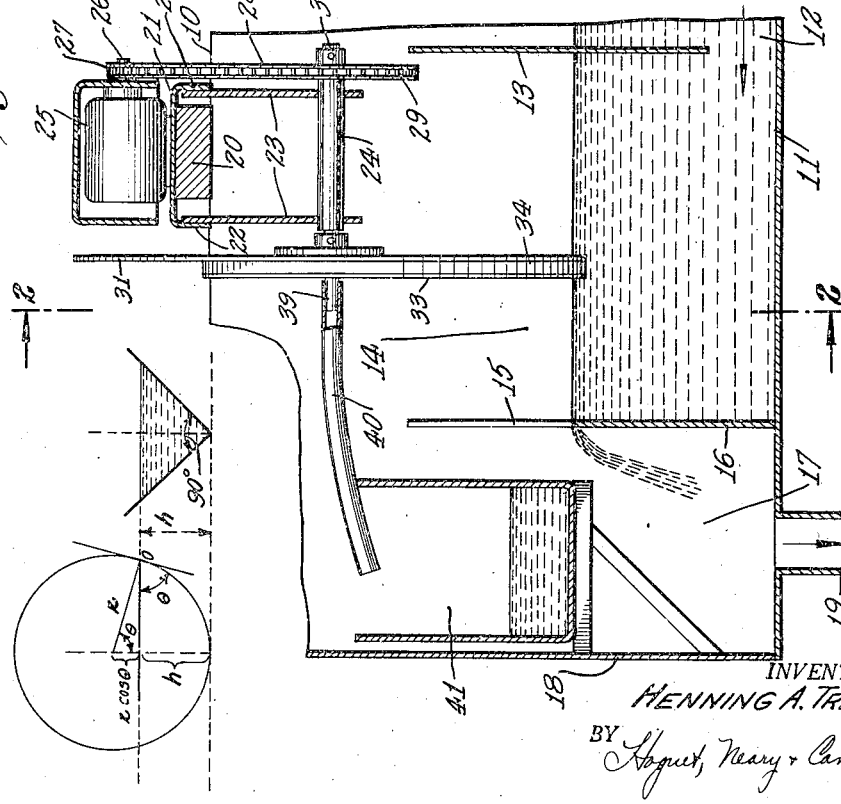
INVENTOR.
HENNING A. TREBLER
BY Hoguet, Neary & Campbell
ATTORNEYS Patented July 12, 1949

2,476,163

UNITED STATES PATENT OFFICE 2,476,163

CONTINUOUS AUTOMATIC SAMPLING OF LIQUIDS IN PROPORTION TO THE FLOW

Henning A. Trebler, Baltimore, Md., assignor, by mesne assignments, to National Dairy Research Laboratories, Inc., New York, N. Y., a corporation of Delaware Application May 15, 1944, Serial No. 535,572

6 Claims. (Cl. 73—424)

1

The present invention relates to the continuous automatic sampling of liquids in proportion to their rate of flow and more particularly to apparatus for effecting such sampling.

Heretofore it has been proposed to effect such sampling in connection with the use of a weir box or tank receiving waste liquid, such as sewage, through any suitable inlet, and discharging it through a suitable outlet which may be in the form of a 90° V notch in a weir plate, the rate of flow through the box being determined by measuring the height of the liquid over the vertex of the V notch and then computing the rate of flow as set forth hereinafter. The samples were removed from the weir box by means including a partially submerged vertical disk slowly rotated in the weir box and carrying a number of small cups placed at such distances from the center of the disk that the number of cups filled would be in proportion to the rate of flow through the weir box.

The cups on the foregoing disk were so inclined that they would empty into a catch funnel as they moved toward the top of the disk. The rate of flow through the V notch was determined by measuring the height of the liquid over the vertex of the notch at about one foot behind the weir so as to eliminate any error due to curvature of the liquid surface at the weir, and then using this value of $h$ in the formula $R=1131h^{2.47}$, where $h$ is measured in feet and $R$ is the rate of flow in gallons per minute.

Such prior sampling means gave very satisfactory results but did not sample strictly in proportion to the flow at all times, in that if the cups were set for example, at positions corresponding to flows of 5, 10, 15 and 20 gallons per minute, the samples would correspond to one rate of flow until the liquid level rose to the proper level to enter the next set of cups. However, the average for an entire day would usually be very satisfactory.

An important object of the invention is to provide a novel and advantageous sampler whereby the volume of liquid removed by the sampler will be in proportion to the rate of flow at all times.

Another object is to provide a sampler whereby the samples are picked up by means including a scoop so designed that each sample taken will be in proportion to the rate of flow at that time.

According to one embodiment of the invention use may be made of a rotatable vertical disk partially submerged in a weir box from which the

2 liquid is discharged through a 90° V notch in a weir plate or wall. Mounted on this disk at one side thereof is a scoop so shaped that the volume of a sample taken up at each revolution of the disk will be in substantially precise proportion to the rate of flow through the weir notch.

As the scoop moves slowly upwardly after taking a sample, the sample will flow by gravity to a spout which projects from the side of the scoop axially of the disk. From the spout the sample may flow through a flexible rubber tube to a sample-receiving container. The rubber tube rotates slowly with the rotary sampling device but due to the flexibility of the tube, the tube end will stay in the receiving container.

This type of sampler may be used to advantage in many different fields, such as the sampling of liquids including industrial wastes, and the simultaneous sampling and feeding of chemicals such as chloride of lime to an industrial waste or other liquid in proportion to the flow.

Other objects, features and advantages will appear upon consideration of the following detailed description and of the drawings, in which Fig. 1 is a view in vertical longitudinal section of an apparatus embodying one form of the invention;

Fig. 2 is a view in section on the line 2—2 of Fig. 1; and

Fig. 3 is a diagram for use in developing mathematically an equation for the curve of the bottom of the scoop.

As illustrated, the liquid to be sampled is supplied through an open-top channel having side walls 10 and a bottom 11 and flows through an inlet 12 beneath a still wall or baffle 13 into a weir box 14 and out of said weir box through a V-shaped weir notch 15 in a weir or weir wall 16 which may be in the form of a plate. Preferably the sides of the weir notch 15 form an angle of 90°, the rate of flow through such a weir notch in gallons per minute being calculated by means of the formula $R=1131h^{2.47}$ where $h$ is measured in feet. The overflow from the weir passes into a compartment 17 closed at its far end by a wall 18, and then is discharged from the bottom of the compartment 17 through an outlet 19.

The sampling device may be mounted on a member 20, such as a plank, extending across the channel and resting on the sides 10. Resting on the plank 20 is a channel 21 having downwardly extending flanges 22 which support members or plates 23 carrying a bearing in the form of a tube 24.

Also supported by the transverse member 20 is a motor 25 which drives a shaft 26 and a sprocket wheel 27 fixed thereon and having, by means of a sprocket chain 28, a speed-reducing driving connection with a sprocket wheel 29 fixed on a horizontal shaft 30 passing through the bearing or tube 24. Fixed on the other end of shaft 30 is a vertical disk or wheel 31 which is partially submerged in liquid in the weir box 14. When the liquid in the weir box is at the minimum level the disk 31 projects into the water a very short distance, but with a higher water level the disk will be submerged to a much greater extent.

However, in place of the cups heretofore used, the disk or wheel 31 is provided with a single scoop 32 which gathers up the water in substantially the same proportion at all times to the rate of discharge of the water through the weir notch 15. The disk 31 may serve as one side of the scoop which may also include another side wall 33, and a narrow strip or edge wall connecting said side walls and including a scoop bottom 34 of a shape carefully determined to produce the desired measuring effect. A cover 35 extends from the trailing end of said bottom 34 to a point above the center of the disk, the cover having an extension 36 to provide a scoop inlet 38. The part 37 is substantially in the position of a chord of the circle forming the outline of the disk, said chord corresponding in position to the height of the liquid when the V notch 15 is in use to its full capacity.

As the scoop 32 rotates slowly liquid enters through the inlet 38 in an amount corresponding to the height of liquid above the vertex of the V weir notch. After the forward end of the scoop leaves the liquid, the liquid collects in the part of the scoop between the bottom 34 and the wall portion 35, and then as the scoop revolves further the liquid flows between the walls 35 and 36 to a discharge nozzle 39, projecting from the scoop along the axis of the disk. From the nozzle 39 the liquid flows through a flexible tube 40 into a sample container 41. The tube rests on the adjacent wall of the container 41 and although it turns with the disk it will remain on the wall.

The scoop 32 must pick up samples of the liquid in proportion to the rate of flow over or through the weir notch 15, and such pick-up capacity is primarily dependent upon the shape assumed by the part of the bottom 34 of the scoop. The shape of the bottom 34 which has been worked out both graphically and mathematically, is substantially as follows: The narrow bottom 34 of the scoop starts with its tip at the adjacent edge of the disk, turns inwardly and continues in a flat curve, in the general position of a chord, the circle described by the leading edge of the scoop bottom 34.

The disk 31 and the scoop 32 rotate slowly in a clockwise direction. Starting from the position of the scoop in Fig. 2, there will be communication between the liquid in the box or tank 14 and liquid in the tip of the scoop until the tip just rises above the surface in the tank. Only a very small quantity of liquid can be picked up at the level shown. If the liquid level in the tank rises, more liquid will enter the scoop, but will be limited in such entrance by the rise of the scoop inlet 38 above the liquid level in the weir box 14.

The amount of the liquid taken into the scoop will increase with the rise of liquid level in the box or tank, but this increase will be such that the sampling will at all times be proportional in the same way to the rate of flow measured by the weir. Of course, any part of the bottom reached by the liquid after the tip of the scoop leaves the liquid will have no effect on the measuring.

The mathematical development of the curvature of the curved bottom 34 of the scoop has also been made in connection with the diagram constituting Fig. 3. The development is as follows:

Take point O in Fig. 3 as the origin of polar coordinates. The angle between the tangent at O and the chord passing through the ends of the bottom of the scoop is $\theta$.

The rate of flow through the weir is given by $$R = Kh^a \tag{1}$$

in which $h$ is the height of the segment defined by the chord extending from end to end of the curved bottom of the scoop (for the 90° weir $a = 2.47$ and $K = 1131$ if R is expressed in gal. per min. and $h$ expressed in feet).

In the following calculations, $r$ is the radius of the circle described by the open end of the scoop, and $p$ is the length of the chord passing through the ends of the curved bottom of the scoop.

If the volume of the scoop is $A$ the problem is to find the shape of the scoop such that:

$$\frac{dA}{dh} = \frac{dR}{dh} \tag{2}$$

Now $$\frac{dR}{dh} = aKh^{a-1} \tag{3}$$

and, for the case of a scoop with parallel vertical sides in polar coordinates $dA = \frac{1}{2}p^2 d\theta$ or $$\frac{dA}{dh} = \frac{dA}{d\theta}\frac{d\theta}{dh} = \frac{1}{2}p^2\frac{d\theta}{dh} \tag{4}$$

From the figure: $r \cos \theta + h = r$ or $$\cos \theta = 1 - \frac{h}{r}$$

and by differentiation $$\sin \theta \, d\theta = \frac{dh}{r}$$

or $$\frac{d\theta}{dh} = \frac{1}{r \sin \theta}$$

Substituting this in Equation 4 gives:

$$\frac{dA}{dh} = \frac{1}{2} p^2 \frac{1}{r \sin \theta} \tag{5}$$

From 2, 3 and 5

$$\frac{dA}{dh} = \frac{dR}{dh}$$

or $$\frac{1}{2} p^2 \frac{1}{r \sin \theta} = aKh^{a-1}$$

or $p^2 = 2aKh^{a-1} r \sin \theta$ or substituting for $h$ from the figure gives:

$$p^2 = 2aKr^a(1 - \cos \theta)^{a-1} \sin \theta$$

therefore $p = \sqrt{2aKr^a} \sqrt{(1-\cos \theta)^{a-1} \sin \theta}$ which is the equation for the shape of the scoop. For any given weir and any given sampler the expression $\sqrt{2aKr^a}$ is a constant which can be so selected that the length of $p$ for the maximum $h$, which we wish to include in our sampling, is equal to the length of the chord of the circle with radius $r$ and height of segment $h$ or $c = 2\sqrt{2hr - h^2}$ All our scoops now are built with $r=1'$ (and for 90° weirs) consequently:

$$p \max = c = 2\sqrt{2h-h^2} \text{ for } h \max$$

When the above equation for $p$ is plotted for various angles in polar co-ordinates it will be found that it has the form indicated in the sketch.

It should be understood that it is not necessary to use a completely circular disk. However, such disk tends to prevent undue disturbance of the liquid. Also the rate of rotation of the scoop might be varied.

It should be understood that various changes may be made and that certain features may be used without others, without departing from the true scope and spirit of the invention.

I claim:

1. The combination of a weir box having a weir orifice such that the rate of flow may be determined from the height of the liquid above the low point of said orifice and means for taking samples from the liquid in said weir box in proportion at all times to the rate of flow through said orifice comprising a scoop rotatably mounted on an axis above the maximum level in said weir box for its tip to skim the surface of the liquid if the said liquid level is at the low point of the weir orifice and to dip deeper when the liquid level is higher, said scoop having parallel side walls extending across its axis of rotation, a bottom wall formed with a curvature adapted to control the volume of the sample taken up by the scoop proportionately to the rate of flow through said orifice and extending from said tip to another point on the circle described by said tip and corresponding to the length of a chord whose center is spaced from the circumference of said circle a distance equal to the maximum depth of liquid over the lowest point of said orifice, and means for discharging the sample from the scoop.

2. Apparatus for taking samples from a weir box having a weir orifice whereby the rate of flow may be determined at any time by the height of liquid above the level of the low point of the orifice, comprising a scoop rotatably mounted on an axis above the maximum for said orifice, means for rotating said scoop about its axis at a substantially uniform rate, said scoop having parallel sides perpendicular to said axis and a bottom in a relatively flat curve adapted to determine the volume of a sample taken up by the scoop for any height of the liquid in said orifice, the forward tip of said bottom when in lowermost position being at the level of the bottom of the orifice and the rear end of said bottom being on the circumference of the circle described by said tip and at the other end of a chord having one end at said tip and having its midpoint spaced from the circumference of said circle a distance equal to the maximum height of liquid in said orifice, and means communicating with said scoop for discharging said sample therefrom.

3. Apparatus for taking samples from a weir box having a weir orifice whereby the rate of flow may be determined at any time by the height of liquid above the level of the low point of the orifice, comprising a scoop rotatably mounted on an axis above the maximum for said orifice, means for rotating said scoop about its axis at a substantially uniform rate, said scoop having parallel sides perpendicular to said axis and a bottom in a relatively flat curve adapted to determine the volume of a sample taken up by the scoop for any height of the liquid in said orifice, the forward tip of said bottom when in lowermost position being at the level of the bottom of the orifice and the rear end of said bottom being on the circumference of the circle described by said tip and at the other end of a chord having one end at said tip and having its midpoint spaced from the circumference of said circle a distance equal to the maximum height of liquid in said orifice, said scoop having a cover extending from the rear end of said bottom inwardly and having an inner end adjacent to said axis, another cover portion joined to and extending from the inner end of the first mentioned cover outwardly toward said chord and terminating short of said chord to collect at the axis the sample of liquid picked up by said scoop, and a liquid outlet at said axis.

4. Apparatus for taking samples from a weir box with a 90° weir notch whereby the rate of flow may be determined at any time by the height of liquid above the level of the vertex of the notch, comprising a scoop having an open end rotatably mounted at a level above the maximum height of liquid for said notch, means for rotating said scoop about its pivotal axis at a substantially uniform rate so that its open end describes a circle, said scoop having parallel sides perpendicular to said axis and a curved bottom of which the equation for the shape is $$p = \sqrt{2\ aKr^a} \quad \sqrt{(1-\cos\theta)^{a-1} \sin\theta}$$

in which the maximum value of $$p = c = 2\sqrt{2\ h-h^2}$$

wherein $p$ is the length of the chord passing through the ends of the bottom curve of the scoop $r$ is the radius of said circle $h$ is the height of the segment defined by said chord $a = 2.47$ (for a 90° weir)

$K = 1131$ if the rate of flow is expressed in gallons per minute and the height expressed in feet; and $\theta$ is the angle between the perpendicular to the chord and the radius of said circle passing through the end of the chord, the forward tip of said bottom when in lowermost position being at the level of the vertex of the notch and the rear end of said bottom being on the circumference of the circle described by said tip and at the other end of a chord having one end at said tip and its length corresponding to the distance $h$ from its middle point to the circumference, and means communicating with said scoop for discharging said sample therefrom.

5. The combination of a weir box having a 90° weir notch whereby the rate of flow through the notch at any time may be calculated from the height of the liquid above the vertex of the notch, and means for taking samples from the liquid in the weir box comprising a rotating horizontal shaft above the liquid level in said box and parallel to the line of flow to the weir notch, a circular disk mounted on one end of said shaft with its lowermost part at substantially the level of the vertex of the notch, and a sampling scoop on one side of said disk which serves as one side wall, comprising a second side wall spaced from the disk, a bottom shaped to pick up samples of liquid proportional at all times to the rate of flow of the liquid over the vertex of the notch, rear and top walls to direct the samples of liquid to the center of said disk, and means for discharging liquid from said scoop including an outlet through said second side wall opposite the end of said shaft.

6. The combination of a weir box having a weir orifice such that the rate of flow may be determined from the height of the liquid above the low point of said orifice and means for taking samples from the liquid in said weir box in proportion at all times to the rate of flow through said orifice comprising a scoop rotatably mounted on an axis above the maximum level in said weir box for its tip to skim the surface of the liquid if the liquid level is at the low point of the weir orifice and to dip deeper when the liquid level is higher, said scoop having side walls extending across its axis of rotation, a bottom wall formed with a curvature adapted to control the volume of the sample taken up by the scoop proportionately to the rate of flow through said orifice and extending from said tip to another point on a chord of the circle described by said tip, said chord lying at the surface of the liquid at the maximum depth of liquid over the lowest point of said orifice, and passing through said tip, and means for discharging the sample from the scoop.

HENNING A. TREBLER.

REFERENCES CITED

The following references are of record in the file of this patent:

UNITED STATES PATENTS

| Number | Name | Date |
|---|---|---|
| 2,327,123 | Morse | Aug. 17, 1943 |
| 2,348,806 | Gillard et al. | May 16, 1944 |
| 2,388,801 | Roetman | Nov. 13, 1945 |

FOREIGN PATENTS

| Number | Country | Date |
|---|---|---|
| 51,217 | Austria | Dec. 11, 1911 |
| 267,795 | Germany | Dec. 1, 1913 |

Certificate of Correction

July 12, 1949

Patent No. 2,476,163

HENNING A. TREBLER

It is hereby certified that errors appear in the printed specification of the above numbered patent requiring correction as follows:

Column 4, line 42, for "$\cos \theta = 1h - \frac{h"}{4}$" read $\cos \theta = 1 - \frac{h}{4}$; lines 61 and 62, for $$\tfrac{1}{2}p^2 \frac{1}{r \sin \theta} - aKh^{s-1}$$ read $$\tfrac{1}{2}p^2 \frac{1}{r \sin \theta} = aKh^{s-1}$$

and that the said Letters Patent should be read with these corrections therein that the same may conform to the record of the case in the Patent Office.

Signed and sealed this 20th day of December, A. D. 1949.

[SEAL]

THOMAS F. MURPHY,
*Assistant Commissioner of Patents.*